United States Patent
Bäuerle

[19]

[11] Patent Number: 5,860,891
[45] Date of Patent: Jan. 19, 1999

[54] SYSTEM FOR AUTOMATICALLY ADJUSTING THE GEAR RATIO OF A CONTINUOUSLY VARIABLE TRANSMISSION

[75] Inventor: Peter Bäuerle, Ludwigsburg, Germany

[73] Assignee: Robert Bosch GmbH, Stuttgart, Germany

[21] Appl. No.: 822,685

[22] Filed: Mar. 24, 1997

[51] Int. Cl.⁶ .................................................. B60K 41/16
[52] U.S. Cl. .............................. 477/48; 477/49; 74/336 R
[58] Field of Search .................................. 477/45, 46, 67, 477/48, 49; 74/336 R

[56] References Cited

U.S. PATENT DOCUMENTS

| | | | |
|---|---|---|---|
| 4,945,483 | 7/1990 | Tokoro | 477/48 X |
| 5,474,505 | 12/1995 | Seidel et al. | 477/49 |
| 5,672,137 | 9/1997 | Adachi et al. | 477/45 |

*Primary Examiner*—Khoi Q. Ta
*Attorney, Agent, or Firm*—Walter Ottesen

[57] ABSTRACT

The invention is directed to a system for automatically adjusting the gear ratio of a continuously variable transmission mounted next to the motor of a vehicle. The gear ratio is adjusted with a specific speed. The essence of the invention is that a mechanism is provided which facilitates a determination of the speed of the adjustment of the gear ratio of the transmission in dependence upon detected operating parameters. With the system of the invention, an adjustment characteristic of the transmission is obtained which is comfortable for the driver of the vehicle.

3 Claims, 7 Drawing Sheets

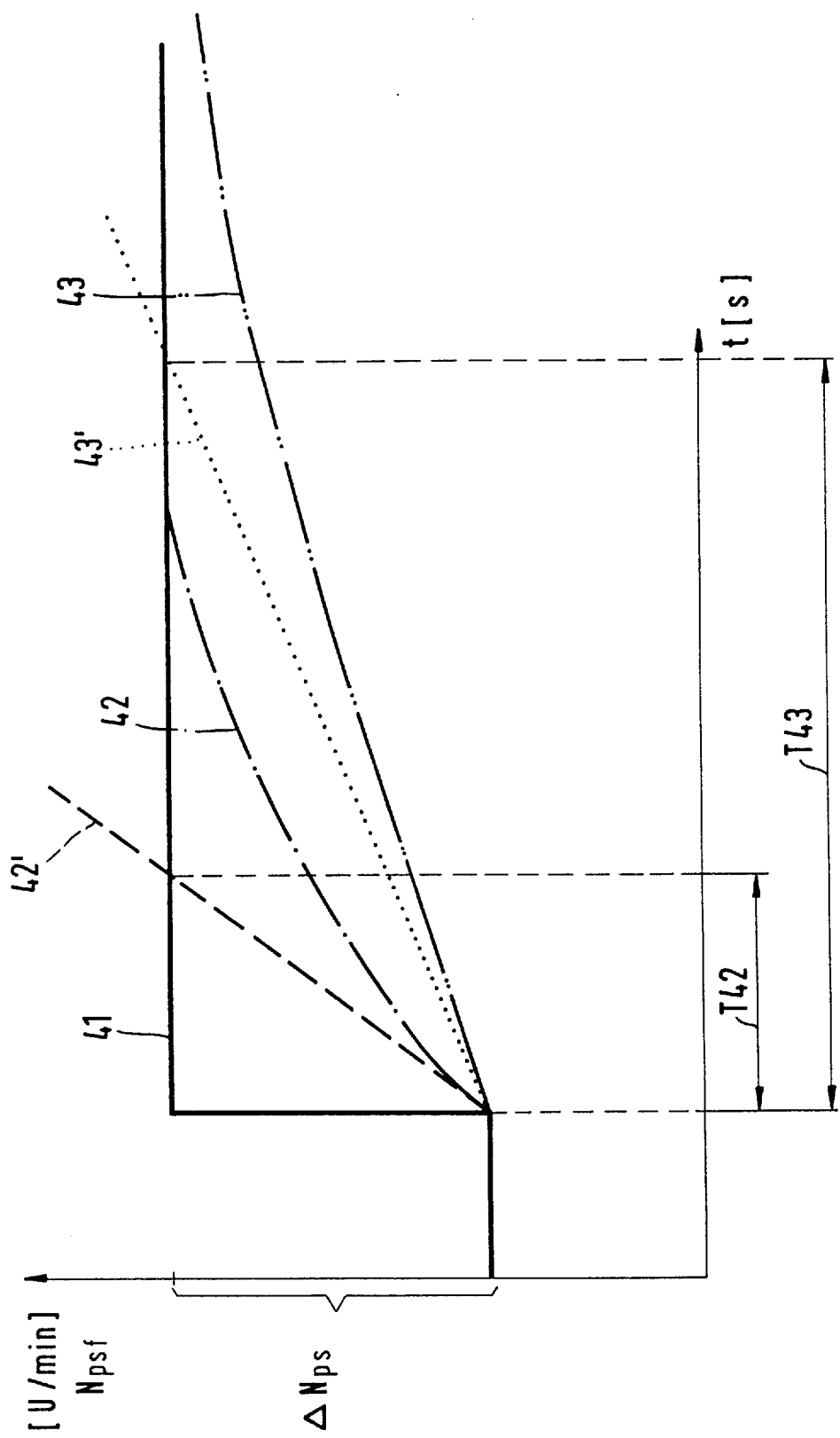

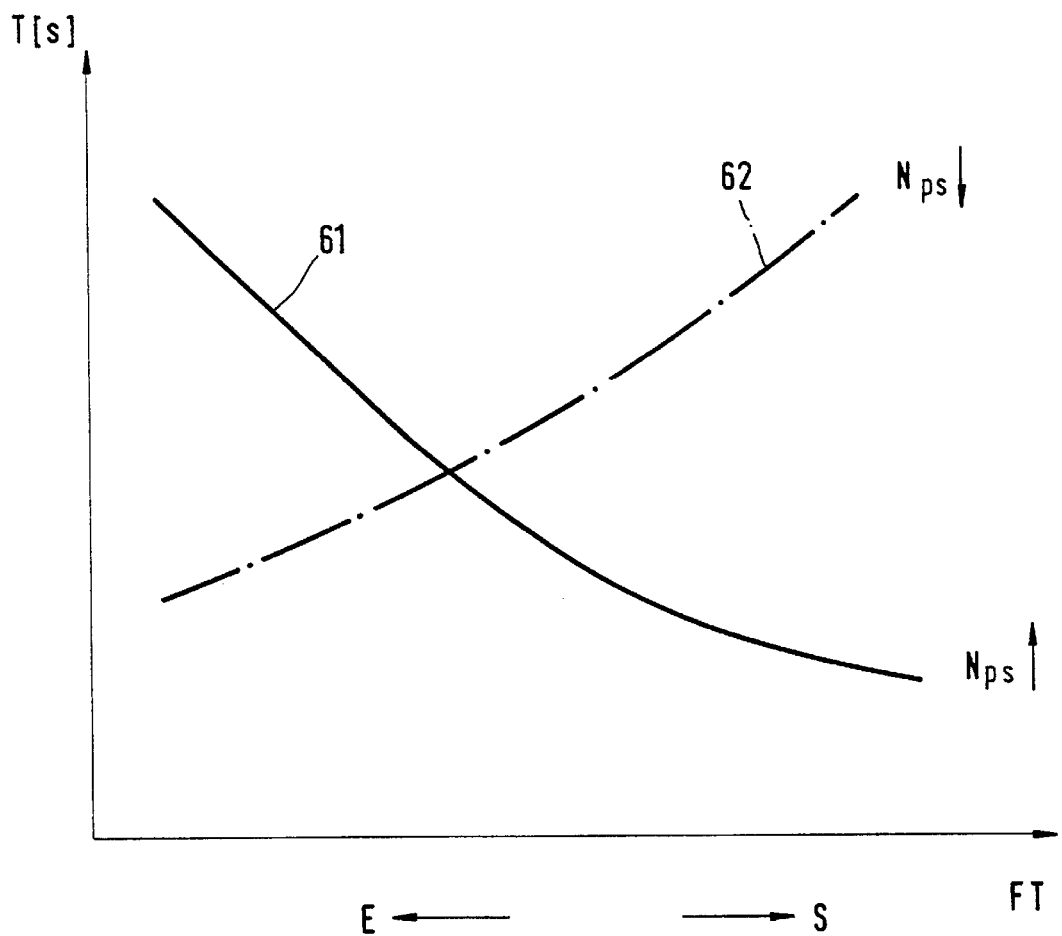

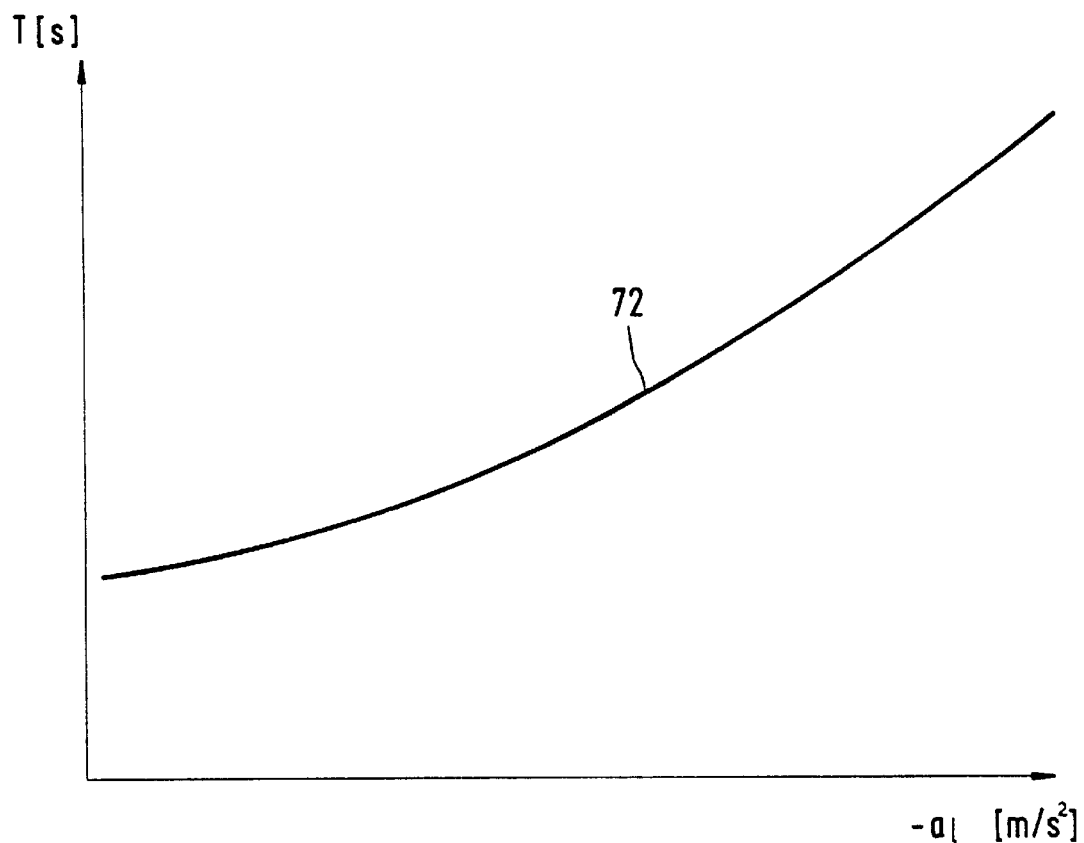

SYSTEM FOR AUTOMATICALLY ADJUSTING THE GEAR RATIO OF A CONTINUOUSLY VARIABLE TRANSMISSION

BACKGROUND OF THE INVENTION

Continuously variable transmissions are known, for example, from European patent publication 0,451,887 as well as from U.S. Pat. No. 5,514,050. In such systems, the change of gear ratio of the vehicle transmission is effected with a specific adjusting speed. In U.S. Pat. 5,514,050, a manual actuation for such a continuously variable transmission is disclosed. In this so-called lever-positioning operation, the driver is afforded the possibility to adjust the continuously variable transmission by actuating an actuating device. Especially, it is here provided that the adjustment of the gear ratio takes place at a constant rate of change.

The speed at which the gear ratio is changed should be adapted optimally to the driver command in order that the driving performance of a vehicle having a continuously adjustable transmission is realized so as to be more attractive for the driver of the vehicle. For a normal acceleration operation of the vehicle, the driver expects an increase of the engine rpm to be a function of the vehicle speed as the driver is already accustomed to from a manual transmission or from a conventional step automatic. When the accelerator pedal is pressed down rapidly such as for a kickdown in a step automatic, a higher motor capacity should be made available immediately, that is, the motor rpm should increase in a relatively short time span. In addition, the driver would like to utilize the braking action of the motor during overrun operation and during braking operation.

Furthermore, the influence of a driver evaluation characteristic variable should be considered.

SUMMARY OF THE INVENTION

It is an object of the invention to provide a system for automatically adjusting the gear ratio of a continuously variable transmission wherein the above-mentioned requirements are realized in the context of such a transmission.

Claim 1.

As already mentioned, the invention proceeds from a system for automatically adjusting the gear ratio of a transmission which is continuously adjustable with respect to its gear ratio and which is mounted downstream of a vehicle motor. Here, the adjustment of the gear ratio is executed with a specific speed. The essence of the invention is that means are provided with which the speed of the adjustment of the gear ratio of the transmission is determined in dependence upon detected operating parameters. With the system of the invention, an adjustment characteristic of the transmission is provided which is more acceptable to the driver.

In an advantageous embodiment of the invention, it is provided that a value is detected as an operating parameter which determines the speed of adjustment of the transmission. This value represents the rate of change of the engine throttle flap and/or of the accelerator pedal actuated by the driver. This affords the advantage that the change of the engine rpm effected by the changes in gear ratio takes place in dependence upon the movement of the accelerator pedal. When the accelerator pedal is depressed slowly, the engine rpm increases slowly in the manner that the driver has up until now been accustomed to from a manual transmission or from a step automatic. For rapid depression of the accelerator pedal, the adjustment of the gear ratio of the transmission takes place in the shortest time, that is, the higher engine power is made available immediately in the manner of a kickdown operation. Any desired number of intermediate stages can be realized between these two extreme points via a characteristic line.

In the above embodiment of the invention, a higher adjustment speed is selected with an increasing positive gradient of the accelerator pedal movement. This means that the speed of adjustment is selected to be higher the more rapidly the driver presses down the accelerator pedal. In addition, a reduced speed of adjustment of the gear ratio of the transmission is selected with an increasingly negative gradient of the accelerator pedal position. This, in turn, means that a relatively low speed of adjustment of the gear ratio of the transmission is selected when the driver moves the accelerator pedal relatively rapidly in the direction of its zero position. This affords the advantage that the engine braking operation in overrun operation is utilized. For example, if the driver takes his foot rapidly off of the accelerator pedal (for example, forward of an obstacle or a curve), then the speed of adjustment reduces for the reducing engine rpm. This means that the engine rpm drops more slowly for a corresponding engine braking action. The engine rpm drops as usual for a normal return movement of the accelerator pedal. Here too, any desired intermediate stages can be adjusted via a characteristic line.

In an advantageous embodiment of the invention, a value is detected, which represents the type of driver, and is utilized as an operating parameter which determines the speed of adjustment of the gear ratio. The detection of such a value is known in various variations from the state of the art. In this connection, reference can be made, for example, to European patent publication 0,406,615. In such a known detection of the driver type, the rate of change of the accelerator pedal position is evaluated because a high rate of change of the accelerator pedal position permits a conclusion to be drawn that a desire is present for high propulsion and therefore that the driver is a so-called engine-power orientated driver; whereas, a low rate of change of the accelerator pedal position permits a conclusion to be drawn that the driver is of the type who wants to optimize fuel consumption. In the case of an adjustment to higher gear ratios of the transmission, a higher speed of adjustment takes place with a propulsion command of the driver which is higher. In the case of an adjustment to lower gear ratios of the transmission, an engine-power orientated driver evaluation effects a reduced speed of adjustment.

In a further embodiment of the invention, a value is detected which represents the longitudinal acceleration of the vehicle (that is, the component of acceleration in forward direction or straight ahead travel of the vehicle). This value is detected as an operating parameter which determines the speed of adjustment. In this context, it is especially provided that with an increasing negative gradient of the longitudinal acceleration of the vehicle (that is, with a reduction of the longitudinal acceleration of the vehicle), a lower adjusting speed is selected than for an increasing positive gradient. This affords the advantage that the engine braking action is improved for a braking operation. When braking the vehicle, a reduced speed of adjustment of the transmission gear ratio is selected for a falling engine rpm. This speed of adjustment, in turn, can be varied as a function of the vehicle deceleration.

In an advantageous embodiment of the invention, it is provided that the adjustment of the gear ratio is performed in such a manner that at least a desired value for the transmission input rpm and/or the engine rpm is determined at least in dependence upon a signal representing the longitudinal speed of the vehicle and in dependence upon a signal representing the detected position of the engine throttle flap and/or the position of the accelerator pedal actuated by the driver. The adjustment of the gear ratio is then effected in such a manner that the detected actual value of the input rpm of the transmission (that is, the engine rpm) is adjusted to the determined desired value. In this embodiment, the transmission input rpm or engine rpm is controlled to a pregiven value by changing the gear ratio of the transmission. Alternatively, the gear ratio itself can be controlled to a pregiven desired value. The adjustment of the gear ratio takes place preferably via the input of an actuating variable in the form of a drive current for an electro-hydraulic control valve which changes the transmission gear ratio by injecting hydraulic liquid.

In the above-mentioned embodiment, a time-dependent filtering of the specific desired value is effected for the transmission input rpm and/or the engine rpm and/or the transmission gear ratio. The filter parameters of this time-dependent filtering are then determined in dependence upon the above-mentioned detected operating parameters.

BRIEF DESCRIPTION OF THE DRAWINGS

The invention will now be described with reference to the drawings wherein:

FIG. 3 shows the response characteristic for function block 103 of FIG. 1;

FIG. 6 shows a plot of filter time constant T plotted as a function of the driver evaluation characteristic variable FT for selecting a filter constant; and, FIG. 7 shows a plot of the filter time constant T of filter block 103 of FIG. 1 as a function of vehicle deceleration $(-a_l)$.

DESCRIPTION OF THE PREFERRED EMBODIMENTS OF THE INVENTION

Figure 1:
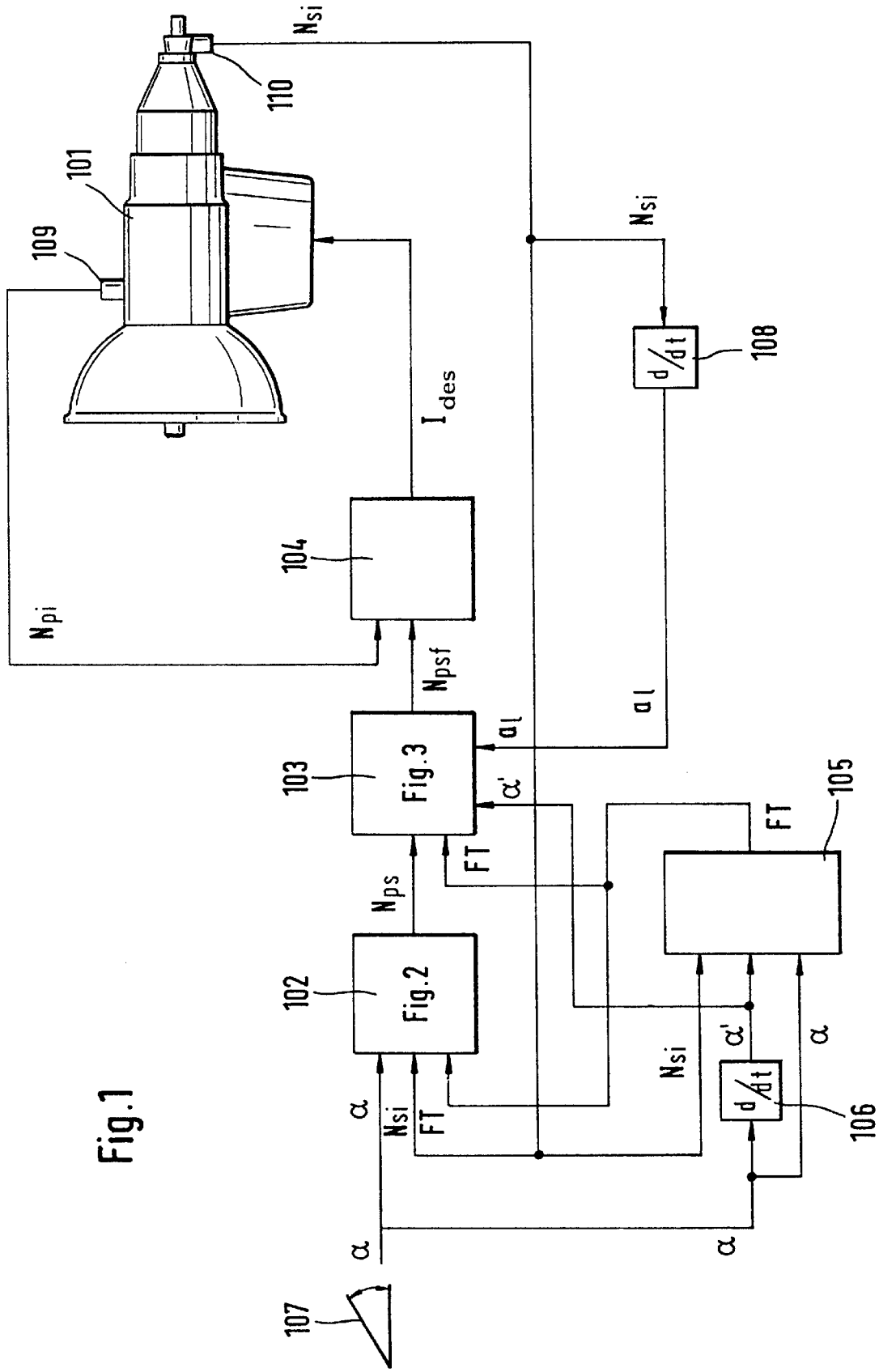
FIG. 1 is a function block diagram of the system according to the invention.

FIG. 1 shows a continuously variable transmission 101 having a gear ratio which changes in dependence upon the desired input $I_{des}$. The desired input $I_{des}$ can, for example, be a drive current for an electro-hydraulic control valve which changes the transmission gear ratio in response to an inflow of hydraulic liquid. The transmission output rpm NSi is detected at the transmission output by a sensor 110 and the transmission rpm $N_{pi}$ is detected by a sensor 109 at the input end of the transmission.

The position α of the accelerator pedal 107 is detected by a position transducer (not shown) and supplied to the function block 102. In addition, block 102 receives the actual value $N_{si}$ of the transmission output rpm or the vehicle longitudinal acceleration. A transmission input desired rpm $N_{ps}$ is determined in block 102 from an adjustment characteristic field. The transmission gear ratio $I_{des}$ results as the quotient $(N_{ps}/N_{si})$ between the transmission desired input rpm and the transmission actual output rpm. The input variables of the block 102 are the accelerator pedal position α and/or the throttle flap angle, the transmission output rpm $N_{si}$ and/or the secondary rpm and/or the vehicle longitudinal speed and the driver evaluation characteristic quantity FT.

The driver evaluation characteristic quantity FT represents the particular type of driver at the time and this characteristic quantity appears in block 105. For this purpose, the following are transmitted to block 105: the transmission output rpm $N_{si}$, the accelerator pedal position α and the accelerator pedal position change α' which is differentiated in block 106. In block 105, a driver-type characteristic quantity FT is determined from these input signals in a manner known per se. In this connection, reference can be made to European patent publication 0,406, 615. The driver evaluation characteristic quantity FT indicates in steps or continuously whether the driver type detected at that instant is more an engine-power orientated type (sports driving) or is a driver type interested in optimizing fuel consumption (an economical driver).

Figure 2:
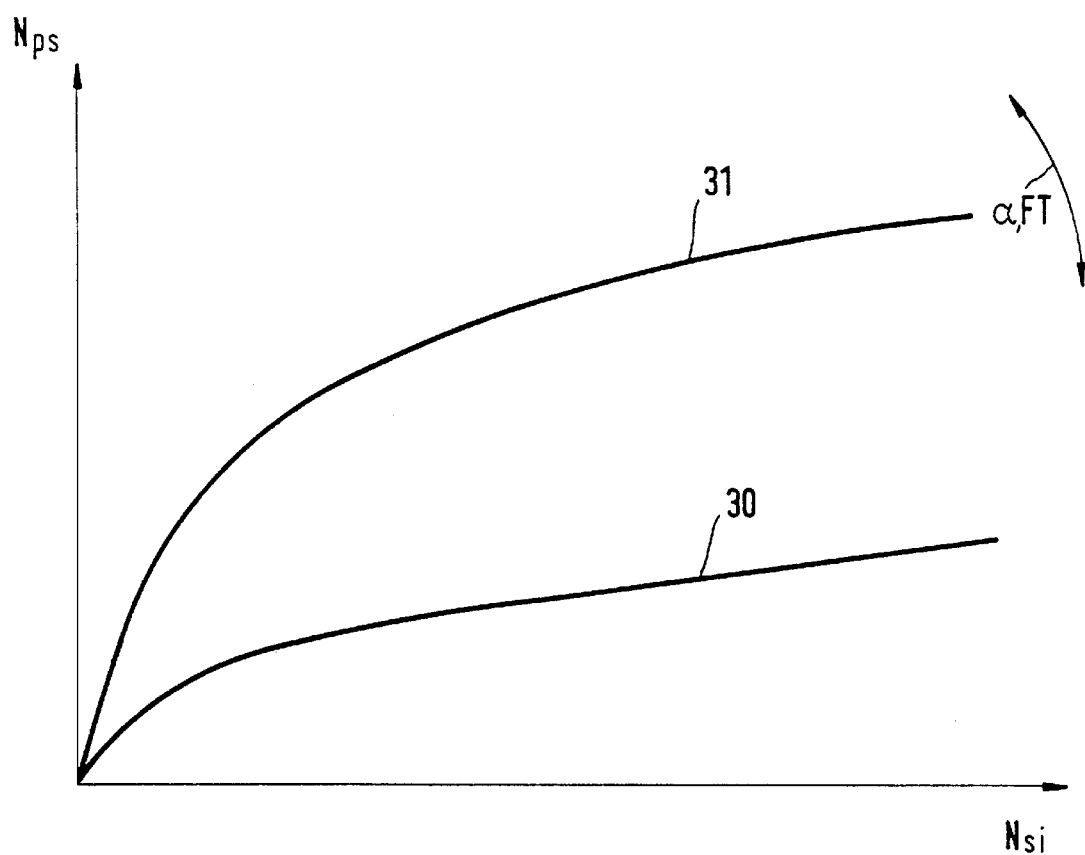
FIG. 2 shows the response characteristic of function block 102 of FIG. 1.

FIG. 2 presents an adjustment characteristic field contained in block 102 of FIG. 1. In this characteristic field, the transmission input desired rpm Nps is plotted as a function of the transmission output rpm $N_{si}$ for linear constant accelerator pedal position α. For different accelerator pedal positions α, an entire family of adjusting characteristic lines results, for example, the characteristic line 30 for lower accelerator pedal positions and the line 31 for higher accelerator pedal positions. As already mentioned, the throttle flap angle can be used in a gasoline engine in lieu of the accelerator pedal position. The vehicle longitudinal speed can be applied in lieu of the transmission output rpm. If the above-described driver type evaluation quantity FT is selected as an additional input variable in block 102, then the transmission input desired rpm $N_{ps}$ can likewise be selected as specific to the driver and/or be corrected.

The transmission input desired rpm $N_{ps}$ generated in block 102 is filtered in the next block 103 and is supplied to a gear ratio controller 104 as a desired quantity $N_{psf}$. It is necessary to filter the output signal of block 102 for the following reasons:

1. for a transmission ratio adjustment which is too rapid, the kinetic energy of the rotating masses, such as motor and converter, is converted into translatory energy in a short time and this leads to intense acceleration or deceleration of the vehicle and is perceived by the driver as uncomfortable; and, 2. if the continuous transmission is provided with a hydraulic drive, then the system pressure can collapse when the transmission ratio adjustment takes place too quickly and this can lead to a through slippage and to a destruction of the interlocking transmitting elements.

A possible trace of the input desired rpm of the transmission after filtering in block 103 is shown as a function of time in FIG. 3. If no filtering takes place in block 103, then this corresponds to the line 41 shown in FIG. 3. At least one of the following occurs: a jump-like primary change, a jump-like transmission input change and/or a jump-like change $\Delta N_{ps}$ of the engine rpm. A specific time-dependent filtering takes place in block 103 (FIG. 1) for the traces 42 and 43 as shown in FIG. 3. Block 103 is a filter of the first order having a time constant T42 or T43. In FIG. 3, it can be seen that a longer filter constant T43 effects a slow speed of adjustment. If one considers different driving programs or different types of driver evaluations, then one reaches different time constants in an E-mode (economic), in a C-mode (comfort) and in a S-mode (sport). These different time constants correspond to different speeds of adjustment of the transmission gear ratio.

The converter controller (block 104 of FIG. 1) compares the actual primary rpm to the filtered desired primary rpm or the actual transmission input rpm $N_{pi}$ to the desired transmission input rpm $N_{psf}$ or the actual engine rpm to the desired engine rpm and drives the transmission 101 with the signal $I_{des}$. The invention relates to the filter block 103 of FIG. 1. The filter time constant should then not be constant for increasing and decreasing transmission input rpms; instead, the constant can be changed as a function of the accelerator pedal speed α', the vehicle longitudinal deceleration $a_1$, and a driver evaluation characteristic quantity FT. The vehicle longitudinal deceleration $a_1$, takes place by differentiation in block 108 from the transmission output rpm $N_{si}$. correspondence to the characteristic line 51 in FIG. 4*a*, the transmission input rpm can decrease with increasing accelerator pedal speed or with increasing throttle flap speed α'. These transmission input rpms increase for the time constant T for the filter in block 103 (FIG. 1). With this accelerator pedal speed or throttle flap angle speed α', the maximum value during an accelerator pedal movement is of concern in correspondence to FIGS. 5*a* and 5*b*. Likewise, and as shown in FIGS. 5*a* and 5*b*, the minimum value during an accelerator pedal movement is shown with the minimum value α'. In FIG. 3, and as an example, two different rpm increases 42' and 43' are shown with the corresponding time constants T42 and T43.

Figure 4A:
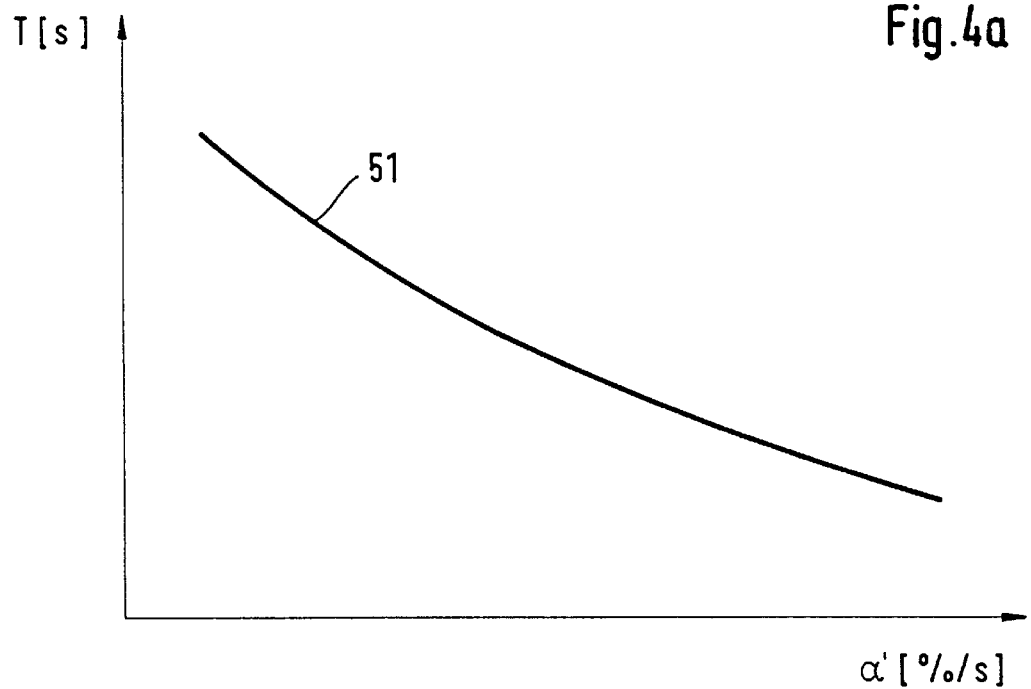
FIGS. 4a and 4b show respective characteristic lines for selecting a filter constant.
Figure 4B:
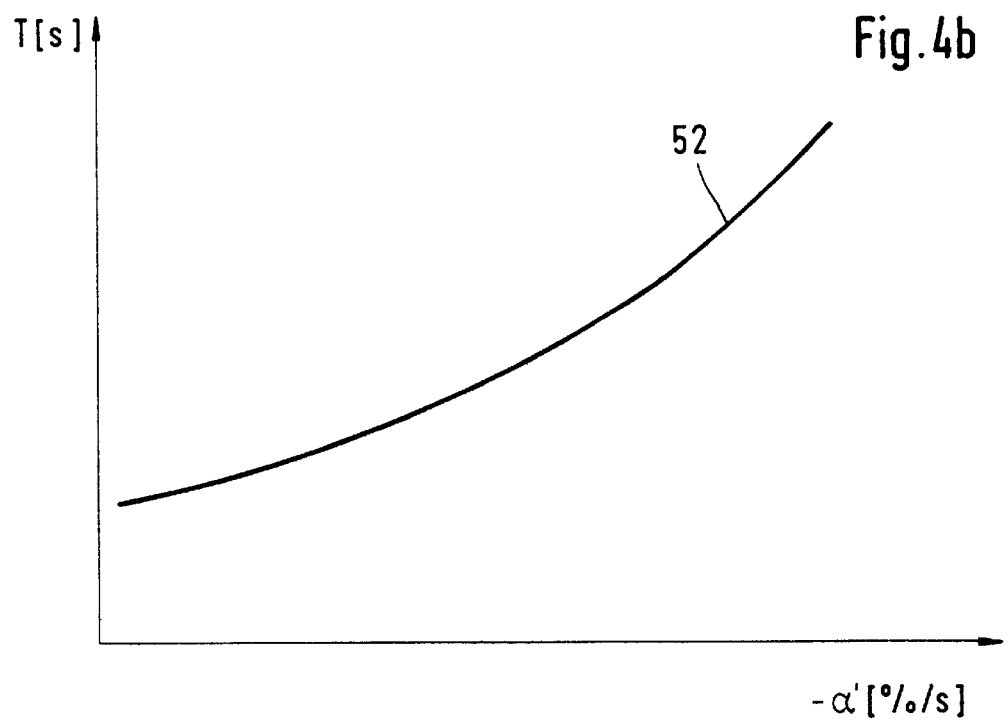
Figure 5A:
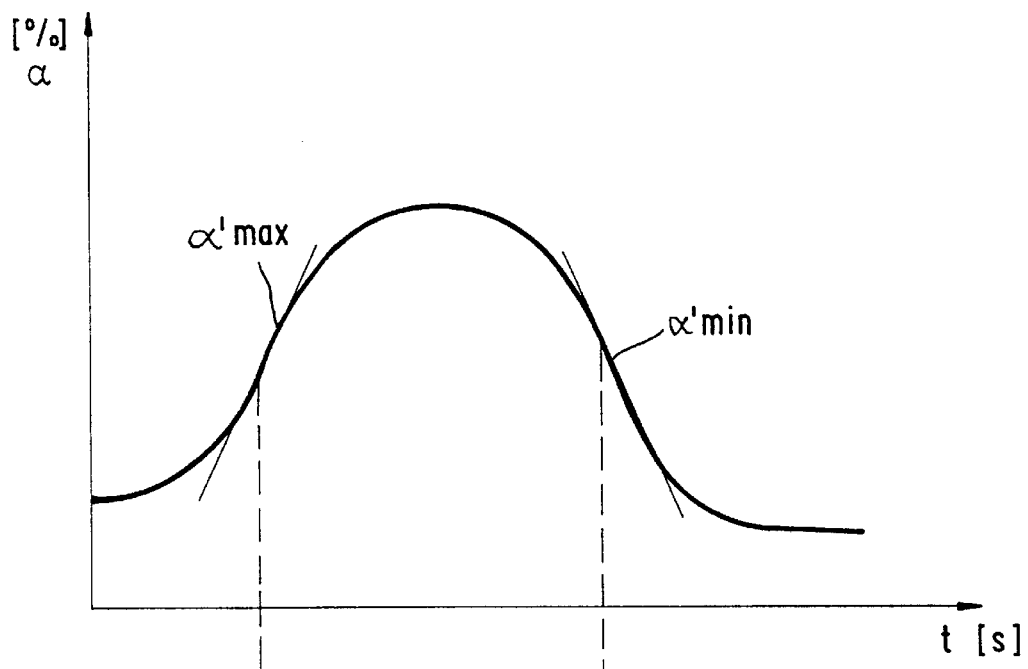
FIGS. 5a and 5b show respective plots of accelerator pedal position α a as a function of time for determining the maximum accelerator pedal rate of change.
Figure 5B:
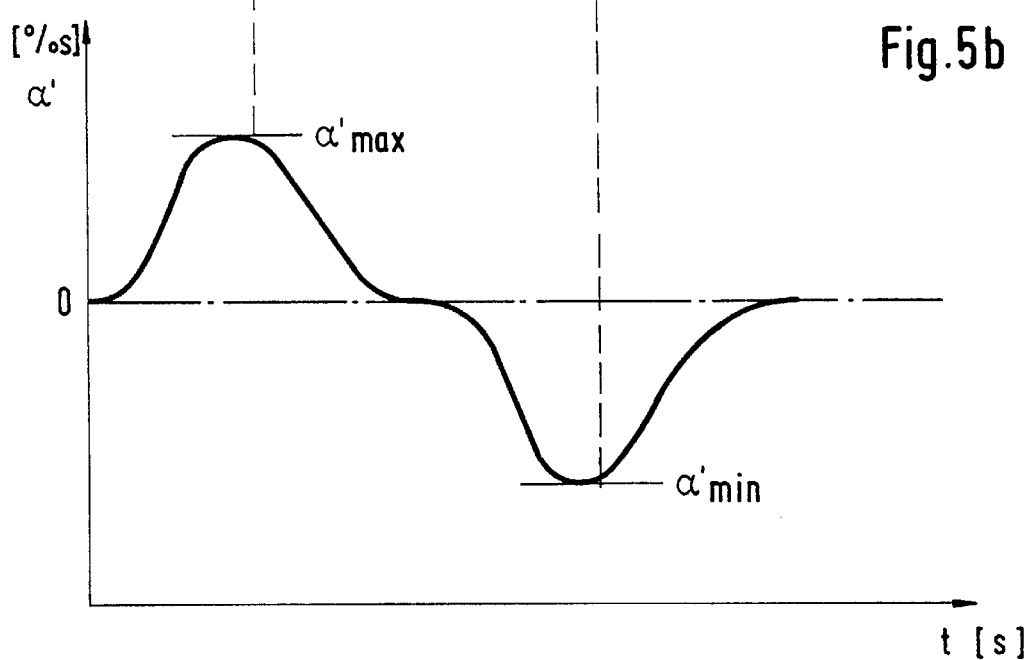

In a manner similar to FIG. 4*a*, the time constants for decreasing transmission input rpms can be dependent upon negative accelerator pedal speed or throttle flap angle speed α'. As shown in FIG. 4*b*, the filter time constant T increases in correspondence to characteristic line 52 with decreasing throttle flap angle speed and with decreasing accelerator pedal position rate of change −α'. The value −α' is, as described above, determined as shown in FIGS. 5*a* and 5*b*.

Likewise, the filter time constant T of the filter block 103 (FIG. 1) can be dependent upon a driver evaluation characteristic quantity FT as shown in FIG. 6. The driver evaluation characteristic quantity FT is, as mentioned, determined from available transmission and vehicle signals and permits a conclusion to be drawn as to the type of driver. If the characteristic quantity FT increases with an increasing sport drive performance then, for example, and in correspondence to the characteristic line 61 (FIG. 6), the filter time constant T decreases for increasing transmission input rpm. In the case of decreasing transmission rpms, the time constant T increases in correspondence to characteristic line 62.

In FIG. 7, a possibility is provided for a braking operation where a special filter time constant T can be inputted for a decreasing transmission input rpm and this filter time constant T can be varied as a function of vehicle deceleration −$a_1$, for example, in correspondence to characteristic line 72 (FIG. 7). The quantity −$a_1$ can define the instantaneous vehicle deceleration or a maximum value of the vehicle deceleration during a braking operation.

It should be further mentioned that the filter 103 (FIG. 1) is a filter of the first order as mentioned above. In principle, any filter having a desired configuration and a desired order can be used. The only precondition is that the increase in transmission input desired rpm or the increase in engine rpm can be varied in correspondence to the above-mentioned influence variables. For example, if start point and end point of FIG. 3 are connected by a straight line, then the time constants T42 and T43 can characterize the straight line equations of 42' and 43' in that they provide the time duration; whereas, the transmission input rpm increases by the difference Δ$N_{ps}$. In principle, a linear rpm increase and a filter of any desired order can be combined. The linear rpm increase can define a limitation.

It is understood that the foregoing description is that of the preferred embodiments of the invention and that various changes and modifications may be made thereto without departing from the spirit and scope of the invention as defined in the appended claims.

What is claimed is:

1. A system for automatically adjusting the gear ratio of a continuously variable transmission having a gear ratio, the transmission being disposed downstream of a motor of a motor vehicle, the system comprising:

means for detecting a plurality of operating parameters;

means for adjusting said gear ratio at a speed dependent upon said operating parameters;

said adjusting means including means for adjusting said gear ratio in such a manner that at least one of a desired value ($N_{ps}$) for the transmission input rpm and a desired value for the engine rpm is determined in dependence upon a signal ($N_{si}$) representing the vehicle longitudinal speed and in dependence upon at least one of the following: the detected position of the throttle flap of the motor and the signal (α) representing the accelerator pedal actuated by the driver; and, the adjustment of the gear ratio for adjusting the detected actual value ($N_{pi}$) to a specific desired value ($N_{ps}$) is effected; and, said adjustment being an actuating variable in the form of a drive current for an electro-hydraulic control valve whereby said gear ratio of said transmission is changed by injecting hydraulic liquid; and, said adjusting means including filter means for filtering the specific desired value ($N_{ps}$) as a function of time; and, said filter means having a filter parameter (T) determined in dependence upon the detected operating parameters (α', FT, $a_1$).

2. A system for automatically adjusting the gear ratio of a continuously variable transmission having a gear ratio, the transmission being disposed downstream of a motor of a motor vehicle, the system comprising:

means for detecting a plurality of operating parameters;

means for adjusting said gear ratio at a speed dependent upon said operating parameters;

said gear ratio is so adjusted that the actual gear ratio ($I_{act}$) is controlled to a corresponding desired value ($I_{des}$); and, the control includes a time-dependent filtering unit having a filter parameter (T) which is determined in dependence upon the detected operating parameters (α, FT, $a_1$).

3. A system for automatically adjusting the gear ratio of a continuously variable transmission having a gear ratio, the transmission being disposed downstream of a motor of a motor vehicle, the system comprising:

means for detecting a plurality of operating parameters;

means for adjusting said gear ratio at a speed dependent upon said operating parameters;

a first one of said operating parameters is a first value (α') which represents at least one of the rate of change of the throttle flap and the rate of change of the accelerator pedal;

a second one of said operating parameters is a second value (FT) representing the type of driver operating the motor vehicle;

a third one of said operating parameters is a third value ($a_1$) representing the longitudinal acceleration of the vehicle; and, said speed of adjustment of said gear ratio decreases with an increasing negative gradient of said third value ($a_1$) corresponding to a reduction of the vehicle longitudinal acceleration.

* * * * *

UNITED STATES PATENT AND TRADEMARK OFFICE
CERTIFICATE OF CORRECTION

PATENT NO. : 5,860,891
DATED : January 19, 1999
INVENTOR(S) : Peter Baeuerle

It is certified that error appears in the above-identified patent and that said Letters Patent is hereby corrected as shown below:

On the title page, between [22] and [51]: insert
-- [30] Foreign Application Priority Data
Mar. 22, 1996 [DE] Germany ..... 196 11 431.4 --.

In column 3, line 31: delete "a".

In column 3, line 48: delete "NSi" and substitute -- $N_{si}$ -- therefor.

In column 4, line 16: delete "Nps" and substitute -- $N_{ps}$ -- therefor.

In column 5, line 9: between "." and "correspondence" insert -- In --.

In column 6, line 42: delete "(α," and substitute -- (α', -- therefor.

Signed and Sealed this

Seventeenth Day of August, 1999

Attest:

Q. TODD DICKINSON

*Attesting Officer*   *Acting Commissioner of Patents and Trademarks*